ANHYDROUS CaCl₂

4-20 MESH GRANULAR MADE BY CRUSHING AND SCREENING DEHYDRATOR CAKE

June 28, 1966 W. A. MacWILLIAMS 3,258,059
PROCESS AND APPARATUS FOR REMOVING WATER FROM INORGANIC MATERIAL
Filed Dec. 27, 1963 7 Sheets-Sheet 6

ANHYDROUS Ca Cl$_2$
CAKE AS DISCHARGED FROM DEHYDRATOR

ANHYDROUS Ca Cl$_2$
PLUS $\frac{1}{2}$" LUMP MADE BY CRUSHING AND
SCREENING DEHYDRATOR CAKE Inventor
William A. MacWilliams
By Cushman, Darby & Cushman
Attorneys

United States Patent Office 3,258,059
Patented June 28, 1966

3,258,059
PROCESS AND APPARATUS FOR REMOVING
WATER FROM INORGANIC MATERIAL
William A. MacWilliams, Two Hills, Alberta, Canada,
assignor to Western Chemicals Ltd., Two Hills, Alberta,
Canada
Filed Dec. 27, 1963, Ser. No. 333,952
Claims priority, application Canada, July 4, 1963,
879,354
8 Claims. (Cl. 159—10)

This invention relates to a process and apparatus for removing water from inorganic material and more particularly to a new drum drying process for producing anhydrous material in a single stage.

In the production of anhydrous salts such as calcium chloride, disodium phosphate, magnesium salts, etc., it is known to apply a thin layer of concentrated solution of the salt on an internally heated rotating drum and thereby partially dry the salt to a thin flake. An inherent drawback of this process is caused by the insulation of the flake which reduces the amount of heat available from the inside of the drum. Consequently, the moisture content in the flake cannot be feasibly reduced to under 25% by such known drum drying methods. After the flake has been removed, it must be further dried in a second stage to the anhydrous form, that is one having a moisture content of less than 10%. As the second stage drying process involves additional plant equipment, attempts have been made to carry out the drying operation in a single stage using a drum only, but employing longer drying periods. However, this necessarily reduces the capacity of the dehydrating plant. Furthermore, in both the single- and two-stage processes, dust fines are also produced along with the flake material.

One feature of this invention is the provision of a process for producing anhydrous material at high output rates, in a single-stage operation using relatively inexpensive equipment.

Another feature of the present invention is the provision of a novel apparatus for producing anhydrous material in a single stage.

According to one aspect of the present invention there is provided a process which comprises the steps of applying an inorganic salt solution or slurry to a rotating drum, heating the solution so applied to an anhydrous condition by direct contact with combustion gases, continuing the application of solution during the heating step to form a thick crust of anhydrous material on the drum, and then removing the crust.

The inorganic salts which in solution may usefully be employed in this process are those having solid hydrate forms, but water soluble or slightly water soluble materials in slurry form are also suited to this invention.

A wide variety of salts are applicable to the process of this invention. For example, calcium chloride, disodium phosphate and magnesium salts previously mentioned as well as salts and slurries of ferrous sulphate, copper sulphate, barium sulphate, potassium carbonate, sodium carbonate, sodium chloride, etc. may be used. In addition, mixtures of salts including those in the above list may be dehydrated to form homogeneous products.

The invention will be made more clear from the following diagrams in which.

Figure 1:
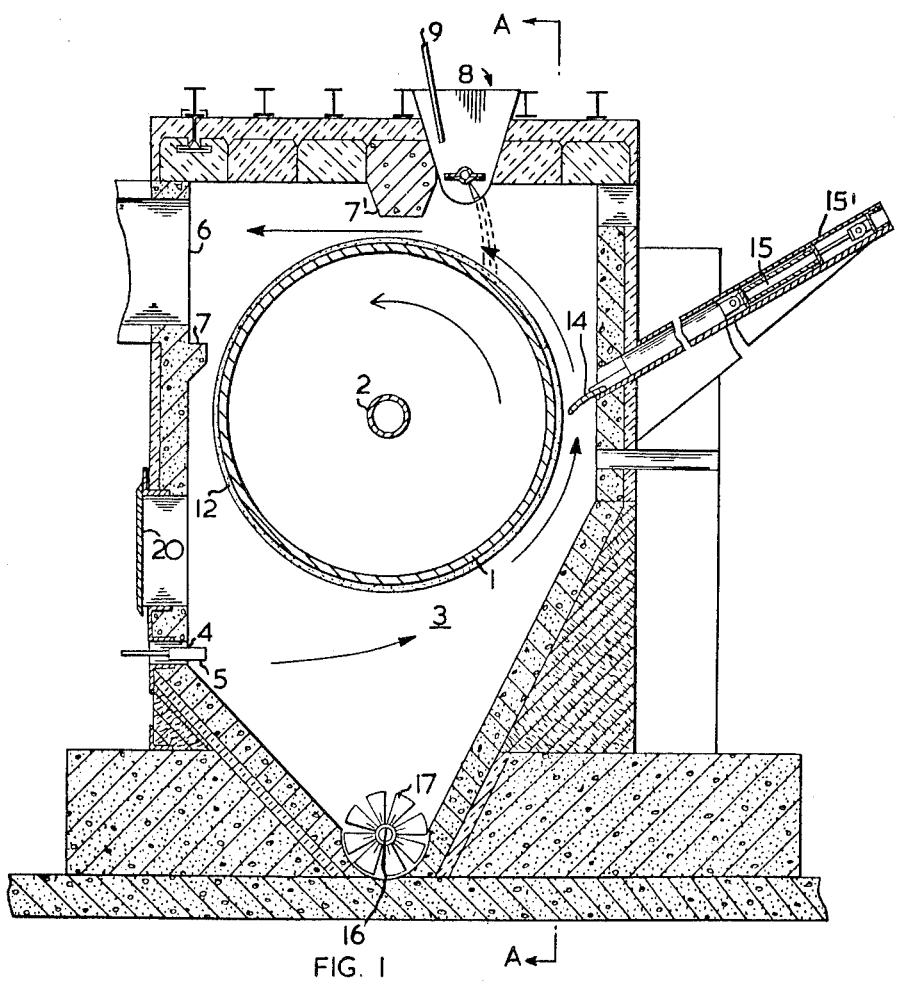
FIGURE 1 is a sectional end elevation of an apparatus according to one aspect of the invention.
Figure 2:
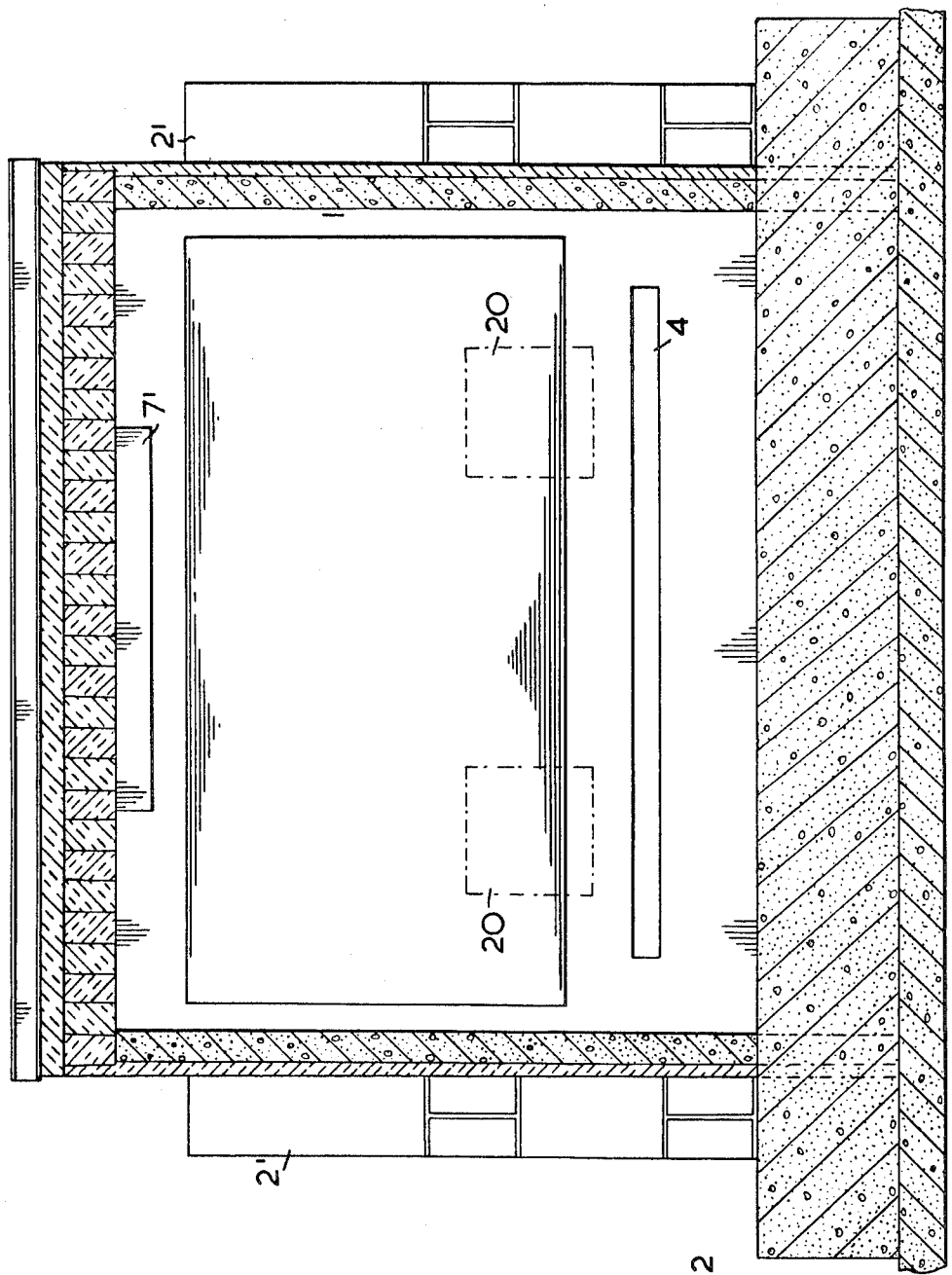
FIGURE 2 represents a sectional side elevation taken along the line A—A of FIGURE 1 showing various details of the furnace.
Figure 3:
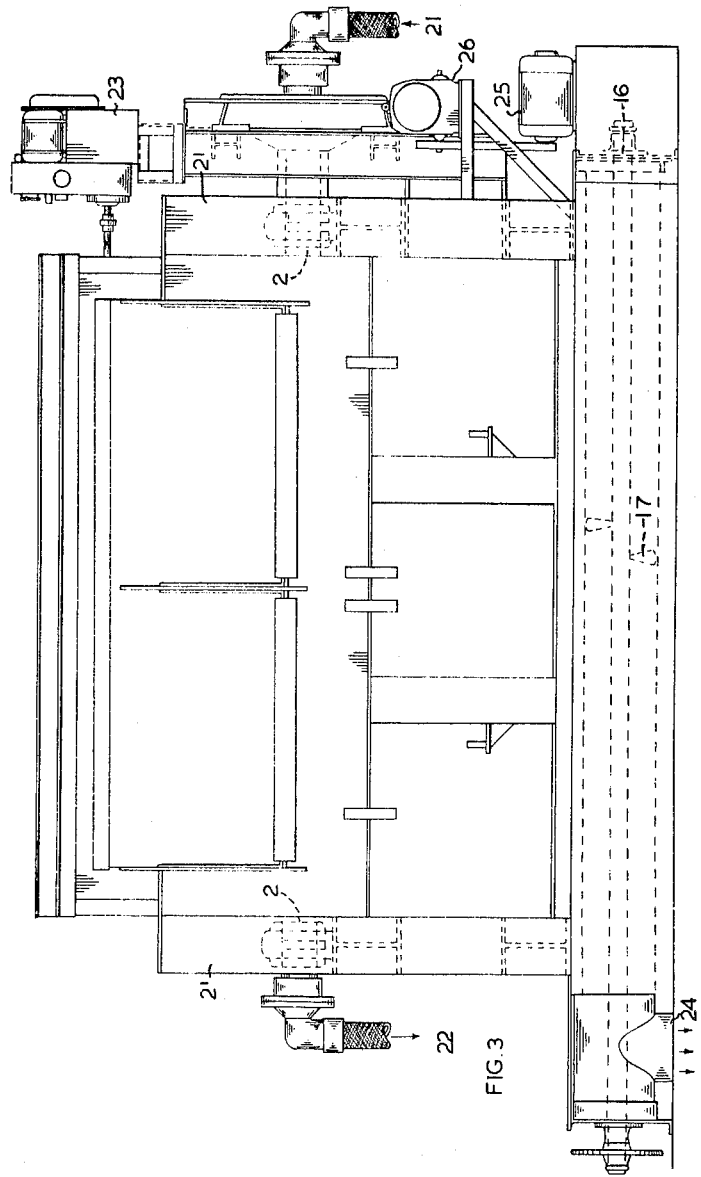
FIGURE 3 represents a side elevation view of the apparatus of this invention.
Figure 4:
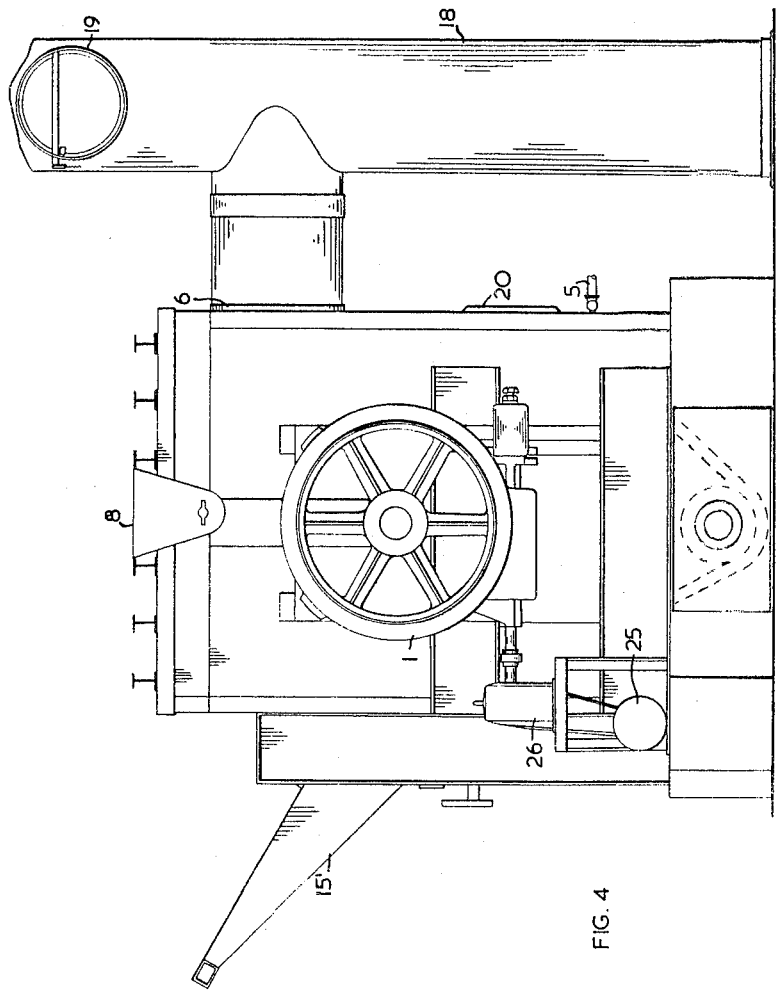
FIGURE 4 represents an end elevation view showing various external features of the invention.

In FIGURES 1 and 3, the drum 1 is shown revolvably mounted on shafts 2, 2 driven by motor 25 through reduction gears 26. The drum shafts, supported on drum frame support 2', shown in FIGURE 2, must be suitably cooled, as by water, because of the high drying temperatures which are used. The cold water inlet 21 and warm outlet 22 for the drum shafts are shown in FIGURE 3. The drum is positioned in a partially enclosed high temperature kiln-type heating chamber 3, having access ports 20, if desired, the lower port of the chamber being provided with a heating gas port 4, through which emerges one or more gas lines 5. Hot drying combustion gases formed by burning natural gas in the heating chamber, contact the outer surface of the rotating drum 1 and finally emerge from the chamber at the outlet 6. Direct contact with indirectly heated gases such as flue gases may also be used for special applications. Maximum contact of the gases with the drum is ensured by positioning the gas line below the drum and directing the gases parallel to the lowermost point of the drum. In addition, the stop 7 is positioned at the upper portion of the enclosure to reduce the amount of gas escaping directly from the port 4 to the outlet 6. Stops 7, 7' also serve to deflect any escaping gases onto the drum. The preferred path of the gases is shown by the arrows. If desired, an exhaust fan (not shown) may be positioned at the outlet 6 to assist in removing heating gases from the chamber. The gases are then vented through stack 18 provided with a barometric damper 19 and rain cap not shown as in FIGURE 4.

Figure 5:
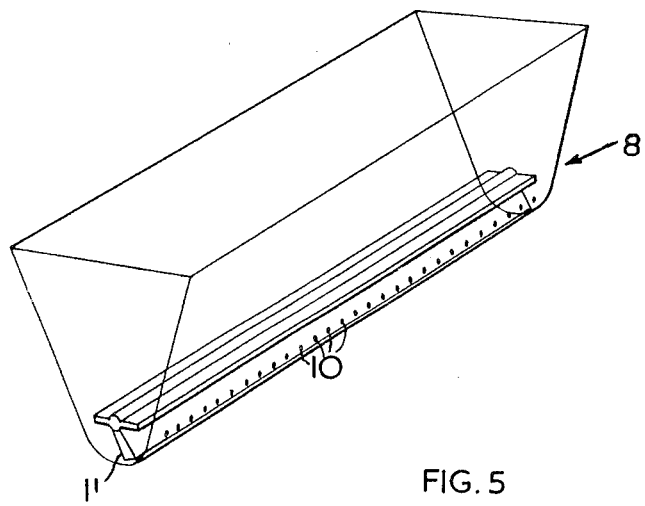
FIGURE 5 is a perspective view of a brine feed trough used in the embodiment shown in FIGURE 1.

A feed material such as calcium chloride is applied to the drum from a trough 8 which is supplied by a feeder line 9 from an evaporator circulating line (not shown). The trough (see FIGURE 5) is perforated with a single row of horizontal feed orifices 10, the orifices are positioned radially at approximately 30° from the horizontal with respect to the rotational axis of the paddle wheel 11, to maintain an accumulation of liquid feed material at the bottom of the trough. Using paddle wheel 11, which is rotated by paddle drive 23, a wave of liquid feed material is cast or pushed up from the bottom of the trough and cast through the orifices 10 to form a full even stream of liquid. By providing slots in the paddle, the clearance between the paddle and trough edge may be made adjustable to offset any unequal distribution in the liquid streams caused by the trough slope. The material is fed onto the rising side of the rotating drum surface, and as the material runs down, it will be dried by the hot combustion gases, the temperature of which is about 2,000° F. as it enters the furnace, for the case where calcium chloride is to be converted to an anhydrous form. When the coating builds up in thickness from a flake to that of the cake 12, further additions of liquid feed will be quickly absorbed by the cake and the tendency for the liquid to drip off the drum will be minimized. If necessary, the feed may be discontinued while the heating is maintained. This is referred to as a "soak period." The water, which is removed in the dehydration process, is vaporized and passes along with the combustion gases into the outlet 6.

Figure 6C:
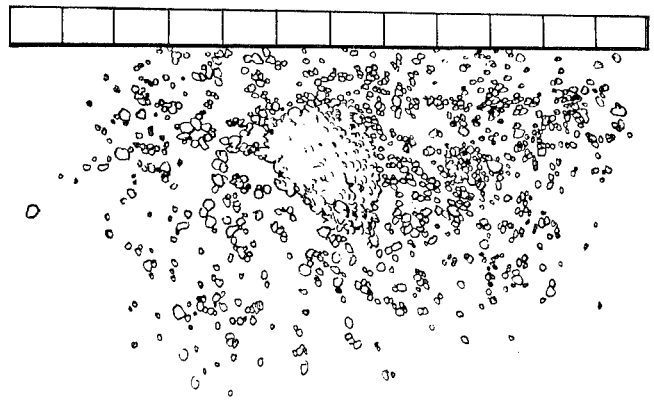
FIGURES 6a, 6b, and 6c show various types of irregular lumps formed by scraping off the material from the drum and from crushing and screening them.
Figure 6A:
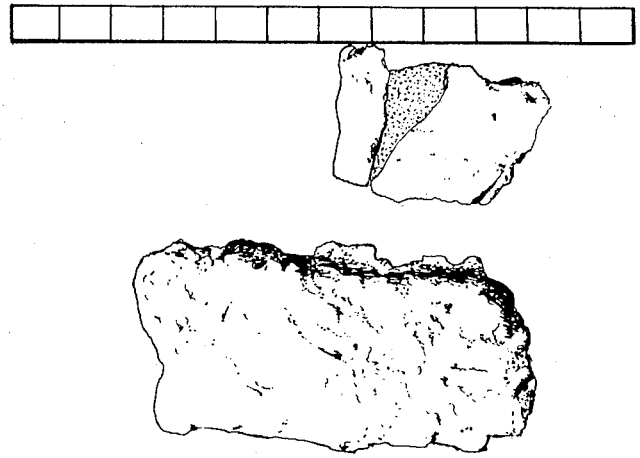
Figure 6B:
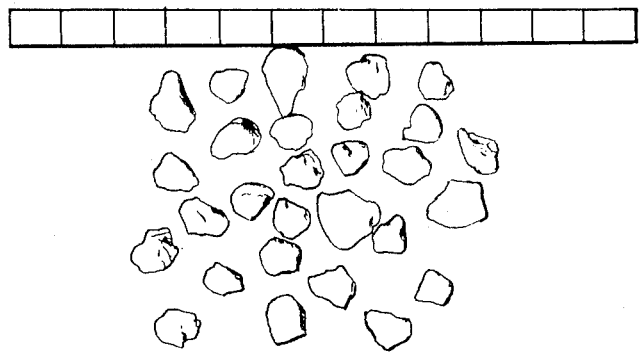

When a sufficiently thick cake has been built up, knives 14 are extended by hydraulic means 15 mounted in support 15' to contact the cake and scrap it off the rotating drum. The material removed from the drum is in the form of slabs which are crushed by the auger breaker blades 17 rotatably mounted on shaft 16 located in the lower section of the apparatus below the drum 1. The blades 17 reduce the slabs in size which at the same time act as a paddle conveyor to discharge the crushed material via chute 24 (see FIG. 3) for additional crushing and subsequent bagging operation. FIGURES 6a–c shows the irregular form of $CaCl_2$ lumps. After removal of the material, a new cycle is commenced.

By changing process and equipment conditions, such as drum size and speed; duration, continuity and rate of feed; gas drying temperatures and B.t.u. output; calcium chloride concentration, etc., wide variations may be produced in various physical properties of the product, such as bulk density and porosity. Obviously products having a wide range of anhydrous content may be obtained.

The following is an illustration of one set of operating conditions and equipment characteristics, but it will be appreciated that these will depend mainly on the desired plant capacity:

Drum: diameter—48 inches; width—96 inches; shell thickness (for $CaCl_2$)—⅜″ Monel cladsteel; drum surface speed—10 feet per minute.

Feed rate: 600 pounds/hr. anhydrous condition feed rate; 35 minute feed duration; and 5 minutes soak interval.

Calcium chloride feed strength: 64% (B.P. 300° F.).

It has been found that for the calcium chloride to undergo effective dehydration without overheating localised areas, about 1400 B.t.u./hr. should be applied to each square foot of drum surface. This is sufficient to heat a 330° F. $CaCl_2$ feed to 550° F. while vaporising the 33% water content of the feed. This will enable the heat to penetrate the necessary distance into the material.

The anhydrous condition of the product exceeds 97% and the bulk density varies from 40–50 pounds per cubic foot depending on the selected operating conditions.

In prior art processes where the second drying stage is employed, it is usual to allow a certain small amount of moisture to be retained in the final product to avoid overheating and this procedure may also be followed in the present process.

The present device represents a single high temperature direct fired machine capable of continually producing anhydrous salts in a wide range of porosities and sizes from solutions of the corresponding salts that are below the strength at which various solid or semi-solidified phases of the hydrates may form. Products so formed tend to be moderately porous, which reduces dissolving times and improves the desiccant value of the hygroscopic salts.

I claim:

1. A process for producing an anhydrous inorganic salt which comprises the steps of: applying an inorganic salt solution to the exterior surface of a single rotating drum in the form of a film; heating and evaporating the solution film so applied to a cake-like anhydrous condition by direct contact with combustion gases; continuing the application of solution during the heating and evaporating stage to form a thick crust of anhydrous material on the drum; and then removing the crust.

2. A process according to claim 1 in which the inorganic salt is selected from the group consisting of calcium chloride, disodium phosphate, magnesium salts, ferrous sulphate, copper sulphate, barium sulphate, potassium carbonate, sodium carbonate and sodium chloride.

3. A process according to claim 1 in which the combustion gases comprise at least one gas selected from the group consisting of flue gases and natural gas.

4. A process according to claim 1 in which approximately 1400 B.t.u./hr. are applied to each square foot of surface to be dehydrated.

5. A process according to claim 1 in which the application of solution to the thick crust formed on the drum is discontinued during the latter portion of the heating stage to allow the removal of excessive moisture from the crust.

6. An apparatus for feeding a concentrated solution of an inorganic salt in continuous streams comprising: a container; a paddle wheel revolvably mounted in said container; a plurality of orifices disposed along one side of said container adjacent said paddle wheel; means for feeding the container with a solution of concentrated inorganic salt; said orifices being positioned to maintain a reservoir of liquid feed solution in the bottom of said container, said orifices being spaced apart from the said paddle wheel to enable the solution to be cast through the orifices in continuous streams.

7. An apparatus for feeding a concentrated solution of an inorganic salt at a uniform rate comprising an elongated parallel sided container; means for feeding the container with said concentrated solution; a paddle wheel rotatably mounted along the elongated axis of the container; and a plurality of uniformly sized and spaced orifices positioned along one of the container sides parallel to and below the paddle wheel shaft, said orifices being located a sufficient distance from the bottom of the container to maintain a reservoir of feed solution in said container, said orifice being spaced apart from said paddle wheel to enable the solution to be cast through the orifices in continuous uniform streams.

8. An apparatus for producing anhydrous inorganic salts in a single stage comprising: a kiln chamber; a drum revolvably mounted within said chamber; a combustion gas inlet to and outlet from said kiln; means to apply a liquid containing an inorganic salt to said rotating drum; means to direct the combustion gases against the said solution so applied to convert it to an anhydrous condition; means for removing the anhydrous material from the drum; and a paddle type discharge auger in the lower part of the kiln adapted to reduce the anhydrous material to a size capable of being fed to a crusher, the said auger also being adapted to convey material from the dehydrator.

References Cited by the Examiner

UNITED STATES PATENTS

| | | | |
|---|---|---|---|
| 1,851,309 | 3/1932 | Heath. | |
| 2,045,115 | 6/1936 | Allen et al. | 159—8 X |
| 2,330,542 | 9/1943 | Barnebl | 210—68 X |
| 2,924,271 | 2/1960 | Conley et al. | 159—12 X |

NORMAN YUDKOFF, *Primary Examiner.*

J. SOFER, *Assistant Examiner.*